(12) United States Patent
Maekawa

(10) Patent No.: US 11,647,131 B2
(45) Date of Patent: May 9, 2023

(54) IMAGE PROCESSING DEVICE, NON-TRANSITORY COMPUTER READABLE MEDIUM, AND IMAGE PROCESSING METHOD

(71) Applicant: FUJIFILM BUSINESS INNOVATION CORP., Tokyo (JP)

(72) Inventor: Takao Maekawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/148,930

(22) Filed: Jan. 14, 2021

(65) Prior Publication Data
US 2021/0136239 A1 May 6, 2021

Related U.S. Application Data

(60) Division of application No. 14/796,291, filed on Jul. 10, 2015, now Pat. No. 10,931,837, which is a
(Continued)

(30) Foreign Application Priority Data

Feb. 29, 2012 (JP) ................................. 2012-043010

(51) Int. Cl.
*H04N 1/00* (2006.01)
*G06F 3/04847* (2022.01)
(Continued)

(52) U.S. Cl.
CPC ..... *H04N 1/00411* (2013.01); *G06F 3/04847* (2013.01); *G06F 3/04883* (2013.01);
(Continued)

(58) Field of Classification Search
CPC ............. G06F 3/04847; G06F 3/04883; G06F 3/04845; H04N 1/00411; H04N 1/00413; H04N 1/00474; H04N 2201/0094
See application file for complete search history.

(56) References Cited

U.S. PATENT DOCUMENTS

| 5,745,719 A | 4/1998 | Falcon |
| 8,296,681 B2 | 10/2012 | Nurmi |

(Continued)

FOREIGN PATENT DOCUMENTS

| JP | H06-89328 A | 3/1994 |
| JP | 2002-192800 A | 7/2002 |

(Continued)

OTHER PUBLICATIONS

U.S. Appl. No. 13/606,545, filed Sep. 7, 2012 in the name of Maekawa.
(Continued)

*Primary Examiner* — Sherrod L Keaton
(74) *Attorney, Agent, or Firm* — Oliff PLC

(57) ABSTRACT

An apparatus is configured to: cause a display to display a GUI comprising a plurality of items; receive user input that is scribed over any of the plurality of items displayed on the display; provide the user with a substantially real-time feedback of the scribing by applying digital ink indicating a scribed line on the GUI; select a first item of the plurality of items based on a position of the scribing within the GUI; recognize a trail of the scribed line; in response to the trail of the scribed line being recognized as a first predetermined trail, perform, on the first item, first processing corresponding to the first predetermined trail; and in response to the trail of the scribed line being recognized as a second predetermined trail, perform second processing on the first
(Continued)

item. The second processing corresponds to the second predetermined trail and is from the first processing.

18 Claims, 14 Drawing Sheets

Related U.S. Application Data continuation of application No. 13/606,545, filed on Sep. 7, 2012, now Pat. No. 9,113,014.

(51) Int. Cl.
*G06F 3/04883* (2022.01)
*G06F 3/04845* (2022.01)

(52) U.S. Cl.
CPC ..... *H04N 1/00413* (2013.01); *H04N 1/00474* (2013.01); *G06F 3/04845* (2013.01); *H04N 2201/0094* (2013.01)

(56) References Cited

U.S. PATENT DOCUMENTS

| | | | |
|---|---|---|---|
| 2002/0109737 A1* | 8/2002 | Jaeger | G06F 3/0481 715/863 |
| 2004/0119763 A1* | 6/2004 | Mizobuchi | G06F 3/04883 715/863 |
| 2006/0085767 A1* | 4/2006 | Hinckley | G06F 3/04842 715/863 |
| 2008/0150908 A1* | 6/2008 | Someno | G06Q 10/10 345/173 |
| 2009/0164894 A1 | 6/2009 | Takekawa et al. | |
| 2010/0125787 A1* | 5/2010 | Chihara | G06F 3/0354 715/702 |
| 2011/0157636 A1 | 6/2011 | Maeda | |
| 2011/0157696 A1 | 6/2011 | Bennett et al. | |
| 2012/0223890 A1 | 9/2012 | Borovsky et al. | |
| 2012/0242604 A1 | 9/2012 | Kato | |
| 2012/0250072 A1 | 10/2012 | Miller et al. | |
| 2012/0293456 A1 | 11/2012 | Ikeda et al. | |

FOREIGN PATENT DOCUMENTS

| | | |
|---|---|---|
| JP | 2009-146351 A | 7/2009 |
| JP | 2009 152818 A | 7/2009 |
| JP | 2010-044548 A | 2/2010 |
| JP | 2011 138237 A | 7/2011 |
| WO | 2010 044151 A1 | 4/2010 |
| WO | 2011 158475 A1 | 12/2011 |

OTHER PUBLICATIONS

Apr. 24, 2014 Office Action issued in U.S. Appl. No. 13/606,545.
Nov. 21, 2014 Final Office Action issued in U.S. Appl. No. 13/606,545.
Apr. 13, 2015 Notice of Allowance issued in U.S. Appl. No. 13/606,545.
Nov. 17, 2015 Office Action issued in Japanese Application No. 2012-043010.
Dec. 29, 2017 Office Action issued in U.S. Appl. No. 14/796,291.
August 8 email, 2018 Office Action issued in U.S. Appl. No. 14/796,291.
Dec. 13, 2018 Office Action issued in U.S. Appl. No. 14/796,291.
Jun. 26, 2019 Office Action issued in U.S. Appl. No. 14/796,291.
Dec. 11, 2019 Office Action issued in U.S. Appl. No. 14/796,291.
May 28, 2020 U.S. Office Action issued U.S. Appl. No. 14/796,291.
Oct. 14, 2020 Notice of Allowance Issued in U.S. Appl. No. 14/796,291.

* cited by examiner

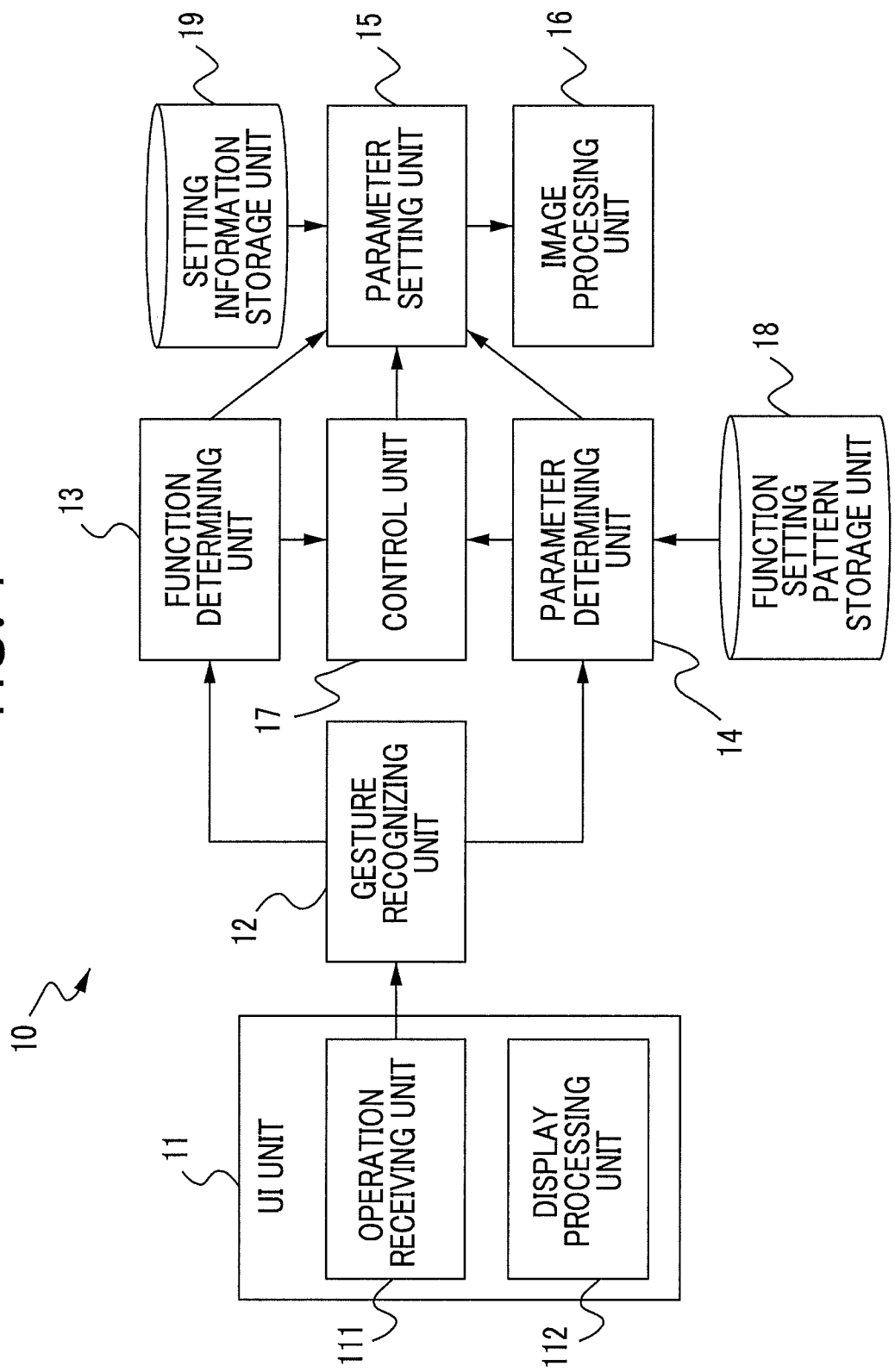

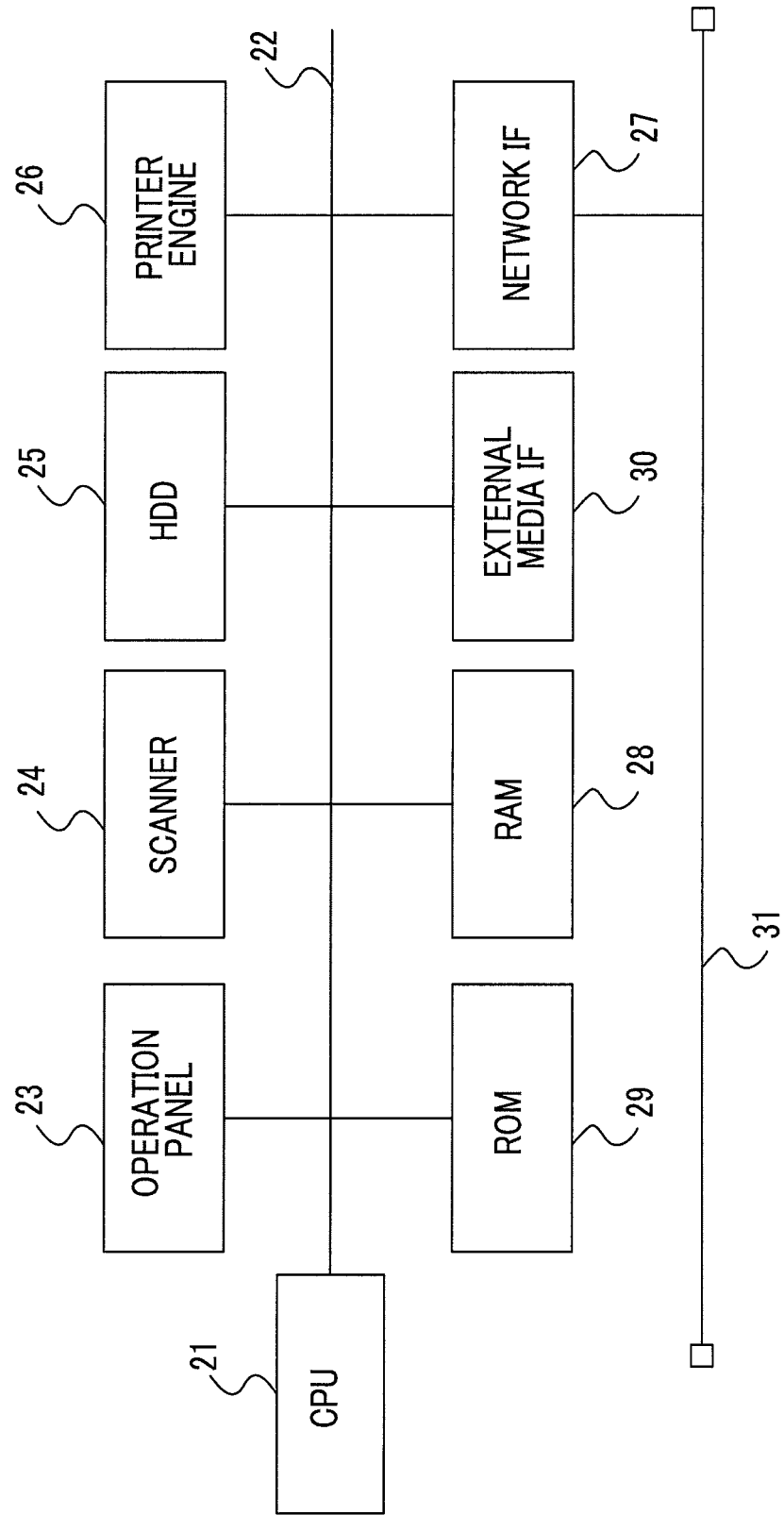

FIG. 3

| FUNCTION | STARTING GESTURE | FUNCTION POSITION | SUBSEQUENT GESTURE | SETTING CONTENT |
|---|---|---|---|---|
| ALL FUNCTIONS | ∧ | — | — | RETURN TO INITIAL SETTING |
| ON/OFF FUNCTIONS ONLY | 0 | — | — | FUNCTION OFF |
|  | 1 | — | — | FUNCTION ON |
| NUMBER OF PRINTS | NUMBER | — | — | NUMBER OF PRINTS |
| SHEET TRAY | NUMBER | — | — | TRAY NUMBER |
| MAGNIFICATION | NUMBER | — | — | MAGNIFICATION VALUE |
| COLOR MODE | 0 | — | — | MONOCHROME |
|  | 1 | — | — | COLOR |
| SINGLE/DOUBLE-SIDED | DOCUMENT: 1 (SINGLE-SIDED)/2 (DOUBLE-SIDED) | — | OUTPUT: 1 (SINGLE-SIDED)/2 (DOUBLE-SIDED) | EX. "12": SINGLE-SIDED → DOUBLE-SIDED |
| Nup OUTPUT FUNCTION | 1 | — | — | NOT USE Nup |
|  | 2 | — | HORIZONTAL BAR (RIGHT TO LEFT OR LEFT TO RIGHT) | 2up DESIGNATE LAYOUT ACCORDING TO DIRECTION OF HORIZONTAL BAR |

| | | | |
|---|---|---|---|
| BINDING | 3 OR MORE | — | Nup WITH DESIGNATED NUMBER OF SHEETS DESIGNATE LAYOUT ACCORDING TO SUBSEQUENT GESTURE |
| BINDING | VERTICAL OR HORIZONTAL LINE | N, INVERTED-N, Z, INVERTED-Z ○ | PERFORM BINDING AT DESIGNATED POSITION BY DESIGNATED NUMBER |
| PUNCHING | VERTICAL OR HORIZONTAL LINE | ○ | PERFORM PUNCHING AT DESIGNATED POSITION BY DESIGNATED NUMBER |
| CONTINUOUS PAGE COPYING | 0 | — | NOT USE CONTINUOUS PAGE COPYING |
| CONTINUOUS PAGE COPYING | HORIZONTAL BAR (LEFT TO RIGHT) | — | CONTINUOUS PAGE COPYING IN LEFT-BOUND DOCUMENT |
| CONTINUOUS PAGE COPYING | HORIZONTAL BAR (RIGHT TO LEFT) | — | CONTINUOUS PAGE COPYING IN RIGHT-BOUND DOCUMENT |
| FACSIMILE NUMBER | NUMBER | — | FACSIMILE NUMBER |
| DOUBLE-SIDE READING | 1 | — | SINGLE-SIDED DOCUMENT |
| DOUBLE-SIDE READING | 2 | — | DOUBLE-SIDED DOCUMENT |
| COMMUNICATION MODE | 3 | — | G3 MODE |
| COMMUNICATION MODE | 4 | — | G4 MODE |
| SCAN BOX | NUMBER | — | STORAGE BOX NUMBER |
| READING RESOLUTION | NUMBER | — | PROCESS AS *100dpi EX. "3" → 300 dpi |

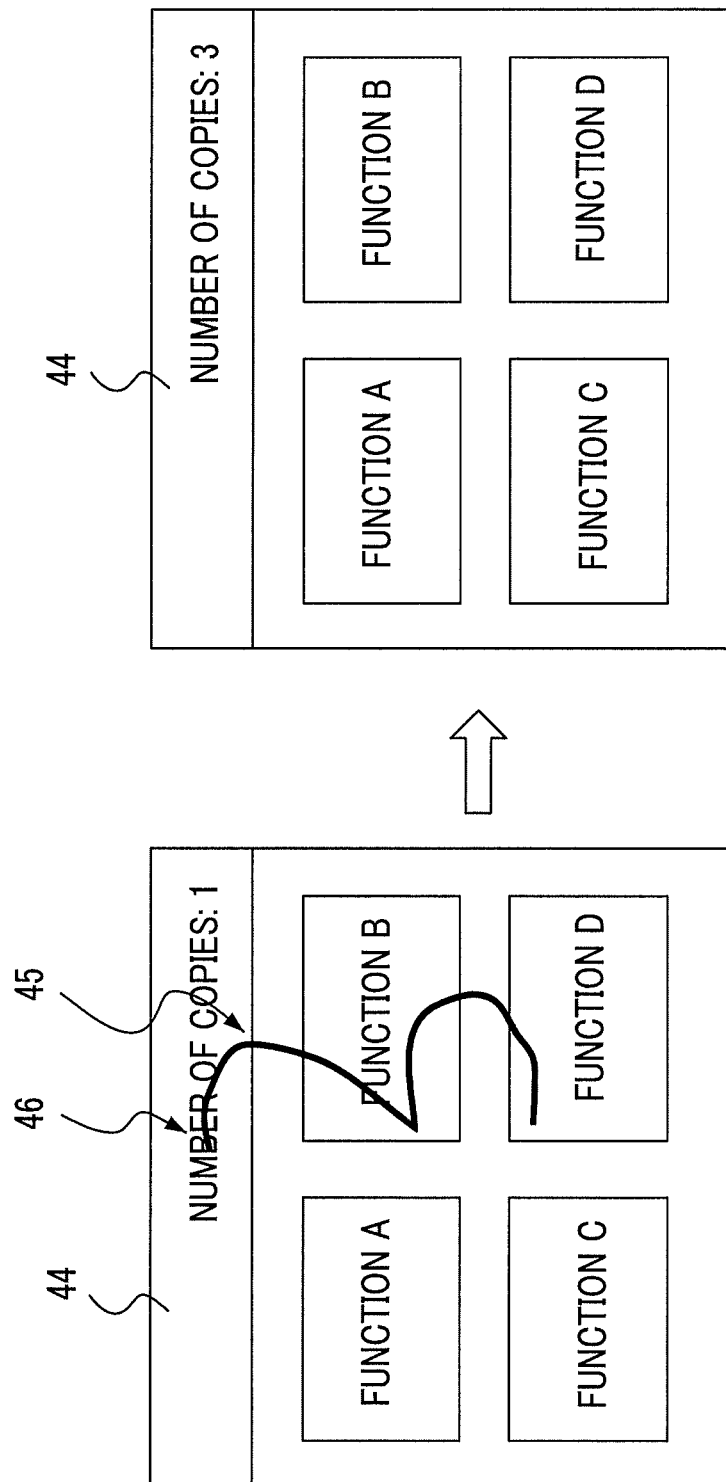

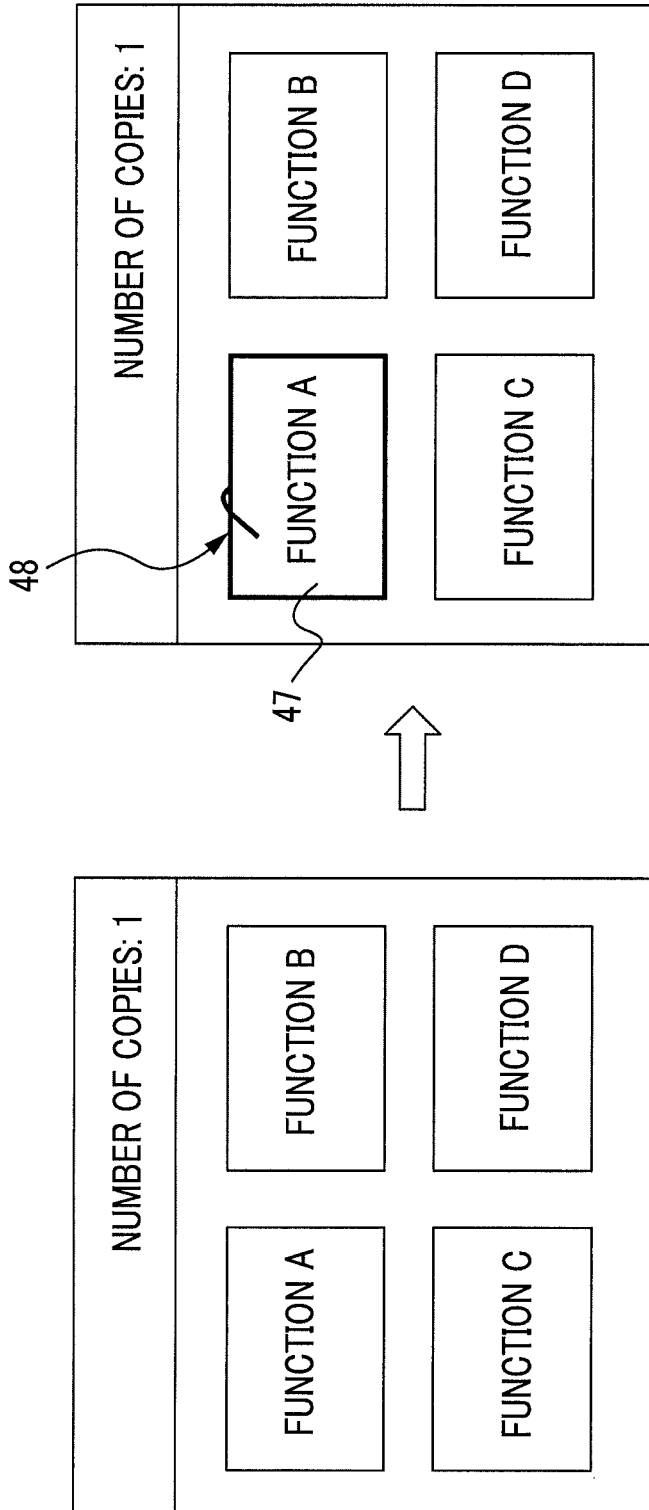

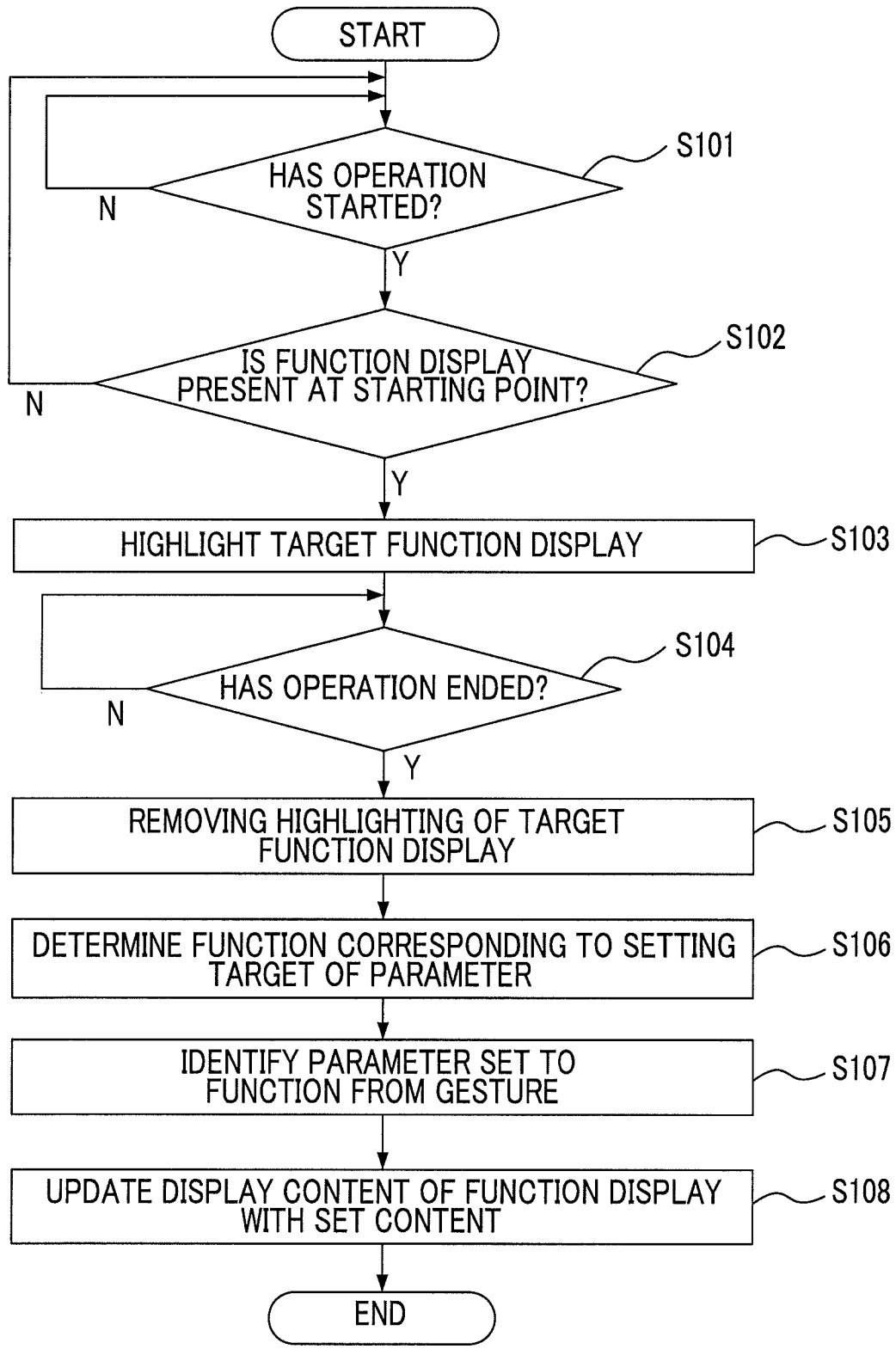

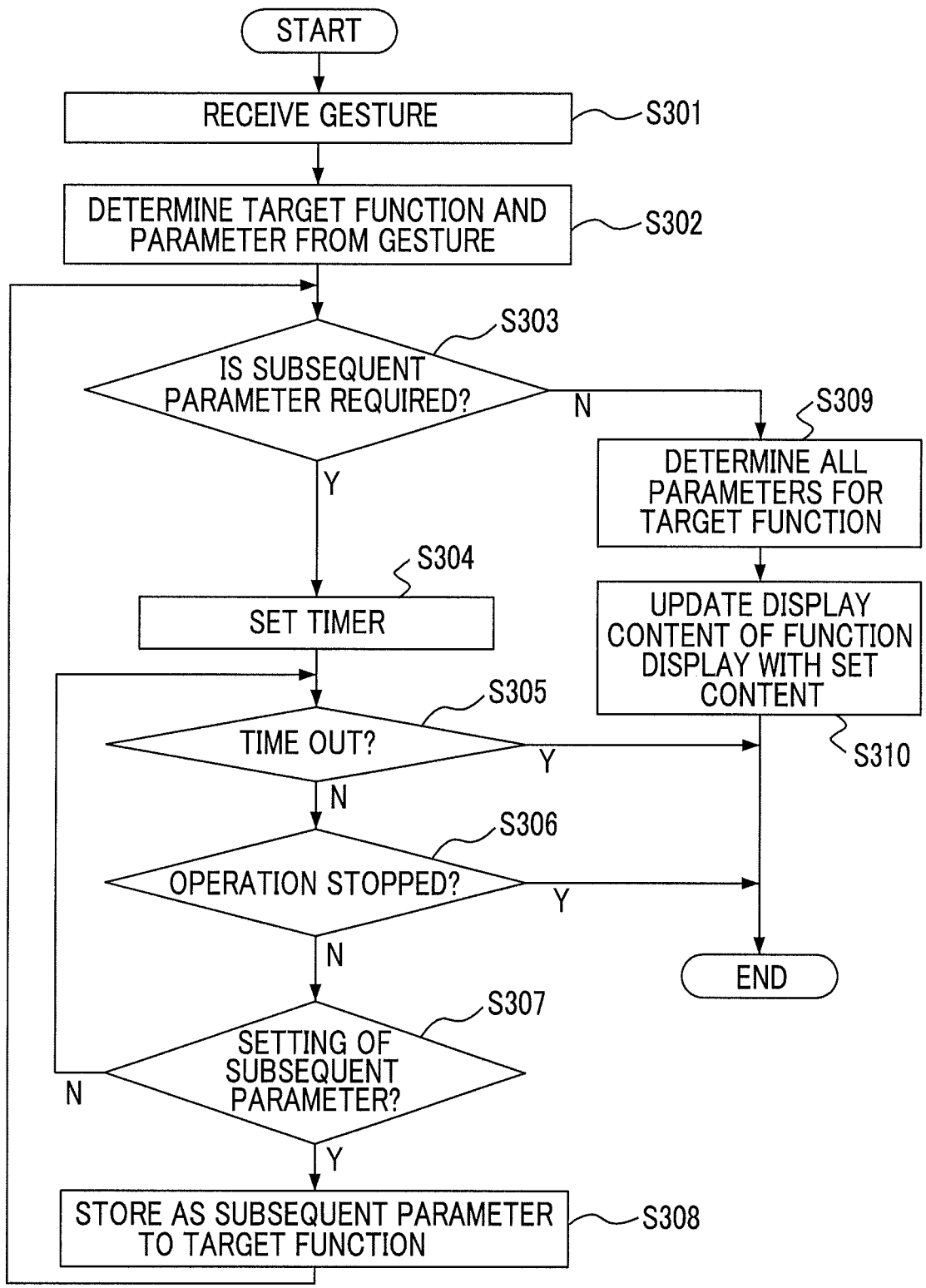

IMAGE PROCESSING DEVICE, NON-TRANSITORY COMPUTER READABLE MEDIUM, AND IMAGE PROCESSING METHOD

CROSS-REFERENCE TO RELATED APPLICATIONS

This is a Division of application Ser. No. 14/796,291 filed Jul. 10, 2015, which in turn is a Continuation of application Ser. No. 13/606,545 filed Sep. 7, 2012, which is based on and claims priority under 35 USC 119 from Japanese Patent Application No. 2012-043010 filed Feb. 29, 2012. The disclosure of the prior applications is hereby incorporated by reference herein in its entirety.

BACKGROUND

Technical Field

The invention relates to an image processing device, a non-transitory computer readable medium, and an image processing method.

SUMMARY

According to an aspect of the invention, there is provided an information processing apparatus comprising a processor configured to: cause a display to display a graphical user interface comprising a plurality of items; receive an input from a user, the input being scribing over any of the plurality of items displayed on the display; provide the user with a substantially real-time feedback of the scribing by applying digital ink indicating a scribed line on the graphical user interface; select a first item of the plurality of items based on a position of the scribing within the graphical user interface; recognize a trail of the scribed line; in response to the trail of the scribed line being recognized as a first predetermined trail, perform first processing on the first item, the first processing corresponding to the first predetermined trail; and in response to the trail of the scribed line being recognized as a second predetermined trail, perform second processing on the first item, the second processing corresponding to the second predetermined trail and being different from the first processing.

BRIEF DESCRIPTION OF THE DRAWINGS

Exemplary embodiments of the present invention will be described in detail based on the following figures, wherein:

FIG. 1 is a block configuration diagram illustrating an exemplary embodiment of an image processing device according to the invention;

FIG. 2 is a hardware configuration diagram of an image processing device according to a first exemplary embodiment;

FIG. 3 is a diagram illustrating an example of function setting pattern information stored in a function setting pattern storage unit of the first exemplary embodiment;

FIGS. 5A and 5B are diagrams illustrating another example of a function setting screen displayed on the operation panel of the first exemplary embodiment;

FIGS. 6A and 6B are diagrams illustrating an example of transition of a display content of the function setting screen displayed on the operation panel of the first exemplary embodiment;

FIG. 7 is a flowchart illustrating a function setting process of the first exemplary embodiment;

FIG. 12 is a flowchart illustrating a function setting process of the third exemplary embodiment;

DETAILED DESCRIPTION

Figure 4A:
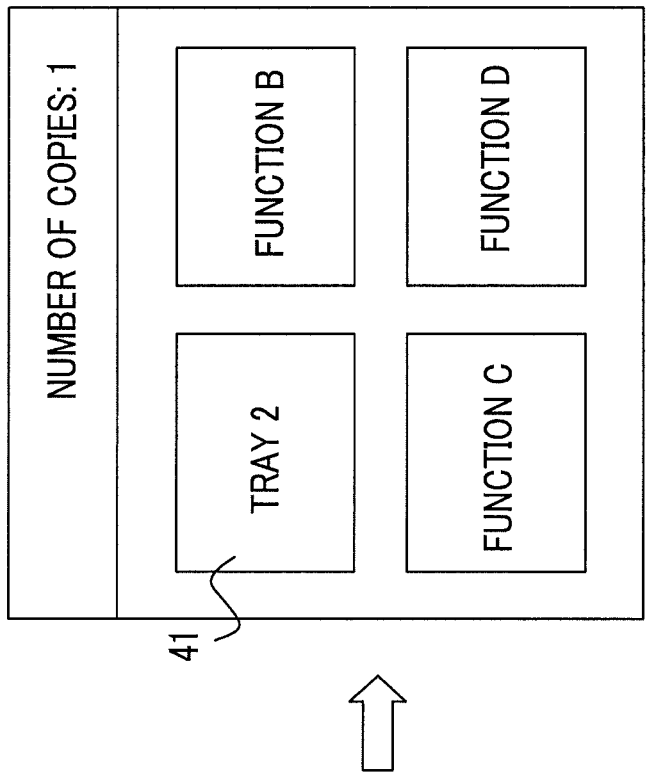
FIGS. 4A and 4B are diagrams illustrating an example of a function setting screen displayed on an operation panel of the first exemplary embodiment.

Hereinafter, an exemplary embodiment of the invention will be described with reference to the drawings.

First Exemplary Embodiment

FIG. 1 is a block configuration diagram illustrating an exemplary embodiment of an image processing device according to the exemplary embodiment of the invention. Constituent components which are not necessary for description of this exemplary embodiment will not be illustrated. FIG. 2 is a hardware configuration diagram of an image processing device 10 according to this exemplary embodiment. The image processing device 10 is a multi-function machine that executes various types of image processing such as copying, printing, and scanning and is a device in which a computer is included.

In FIG. 2, a CPU 21 controls the operations of various mechanisms mounted on this device such as a scanner 24 and a printer engine 26 according to a program stored in a ROM 29. An address data bus 22 is connected to the various mechanisms that serve as a control target of the CPU 21 and performs data communication. An operation panel 23 is a user interface device that receives instructions from a user and displays information. The scanner 24 reads a document set by the user and stores the read document in a hard disk drive (HDD) 25 or the like as electronic data. The HDD 25 stores the electronic document read using the scanner 24. The printer engine 26 prints an image on an output sheet according to an instruction from a control program that is executed by the CPU 21. A network interface (I/F) 27 is connected to a network 31 and is used for transmitting electronic data generated by this device, receiving an electronic mail sent to this device, and accessing this device via a browser. A RAM 28 is used as a working memory during execution of a program and a communication buffer during transmission and reception of electronic data. The ROM 29 stores various types of programs associated with image processing executed by this device, the control of the processing, encryption of electronic data, and transmission and reception of the electronic data. When various types of programs are executed, the respective constituent components described later perform predetermined processing functions. An external media interface (I/F) 30 is an interface to an external memory device such as a USB memory or a flash memory.

Returning to FIG. 1, the image processing device 10 of this exemplary embodiment includes a user interface (UI) unit 11, a gesture recognition unit 12, a function determining unit 13, a parameter identification unit 14, a parameter setting unit 15, an image processing unit 16, a control unit 17, a function setting pattern storage unit 18, and a setting information storage unit 19. The user interface (UI) unit 11 is a user interface unit that is realized in coordination with the operation panel 23 and includes an operation receiving unit 111 and a display processing unit 112. The display processing unit 112 is a display unit that displays a setting screen for functions that may be set when selecting image processing and executing selected image processing. The operation receiving unit 111 receives the operation of the user on the screen displayed on the operation panel 23. The user inputs settings by tracing on a display screen of the operation panel 23 with a finger or a pen, and in this exemplary embodiment, the trail of the operation of the user tracing on the display screen will be also referred to as a "gesture."

The gesture recognition unit 12 is provided as a recognition unit and recognizes the trail, namely a gesture, of the operation of the user on the function setting screen displayed on the operation panel 23. The function determining unit 13 is provided as a determining unit and determines a function selected by the user based on the position of the trail of the operation recognized by the gesture recognition unit 12. The parameter identification unit 14 is provided as an identification unit and identifies a parameter of the function set by the user with respect to the function determined by the function determining unit 13 from the trail of the operation recognized by the gesture recognition unit 12. Here, the "parameter" is an operation condition necessary for operating a function, and values, positions, and the like are set as the parameter. For example, a character string representing a sheet size (A4, A3, or the like) is set as the parameter for a sheet size setting function, and a numerical value such as a tray number (1, 2, 3, or the like) is set as the parameter for a sheet tray selecting function.

The parameter setting unit 15 is provided as a setting unit and performs settings for executing image processing with a combination of the function determined by the function determining unit 13 and the parameter identified by the parameter identification unit 14. Here, the "image processing" in this exemplary embodiment is image processing executed in the image processing device 10. For example, copying, printing, faxing, or the like corresponds to the image processing in this exemplary embodiment. Thus, in executing image processing called copying, for example, the parameter setting unit 15 sets "A4" as the parameter for a sheet size selecting function of the copying function and sets "double-side" as the parameter for a both-side printing function according to the gesture of the user. The image processing unit 16 executes image processing according to the content set by the parameter setting unit 15. The control unit 17 controls the execution of image processing in coordination with the constituent components 11 to 16.

In this exemplary embodiment, the parameters of the respective functions are set according to the gesture of the user, and the parameters set to the functions are stored in the setting information storage unit 19. Further, parameters (default values) that are initially set to the respective functions are stored.

FIG. 3 is a diagram illustrating an example of function setting pattern information stored in the function setting pattern storage unit 18 in this exemplary embodiment. The types of the parameters set to the respective functions, the conditions, and the like are set in the function setting pattern information. In the function setting pattern information of this exemplary embodiment, respective items of information such as a first gesture, a function position, a subsequent gesture, and a setting content are correlated with the respective functions. In the function, a function provided in this exemplary embodiment is set. In the first gesture, a parameter that is to be set initially for the corresponding function and a description of the parameter that is to be set are described. For example, a numerical value is set for a magnification and a flag value (0/1) is set for a color mode as the parameter. In the function position, "O" is set for a function that requires designation of a position as the parameter. For example, a single-side/double-side function requires setting of plural parameters on whether a document is single-sided or double-sided and whether single-sided printing or double-sided printing will be performed. Thus, only the setting of whether a document is single-sided or double-sided (in this exemplary embodiment, "the first gesture") is not sufficient, and it is necessary to set whether a copy (copying sheet) is single-sided or double-sided together as an additional parameter subsequently to the first gesture. In this exemplary embodiment, the gesture for setting a parameter that needs to be set together with the parameter set by the first gesture will be referred to as a "subsequent gesture." Moreover, in this exemplary embodiment, a parameter set by the subsequent gesture will be referred to as a "subsequent parameter." A required subsequent gesture may be changed according to the parameter set by the first gesture as in the aggregated output function. In the setting content, descriptive text for describing respective gestures is described as reference information.

The respective constituent components 11 to 17 of the image processing device 10 are realized by coordination of the computer included in the image processing device 10 and the program operated by the CPU 21 mounted on the computer. Moreover, the respective storage units 18 and 19 are realized by the HDD 25 or the RAM 28 mounted on the image processing device 10. Alternatively, the storage units 18 and 19 may be realized using an external storage device that may be accessed via the network IF 27.

Moreover, the program used in this exemplary embodiment may be provided by a communication unit and may be provided by being stored in a computer-readable recording medium such as a CD-ROM or a DVD-ROM. The program provided from the communication unit or the recording medium is installed in a computer, and the CPU of the computer executes the program sequentially, whereby various types of processing are realized.

Next, the operation of this exemplary embodiment will be described. First, the operation of this exemplary embodiment will be described from the perspective of the user of the image processing device 10 with reference to FIGS. 4A and 4B and FIGS. 5A and 5B.

Figure 4B:
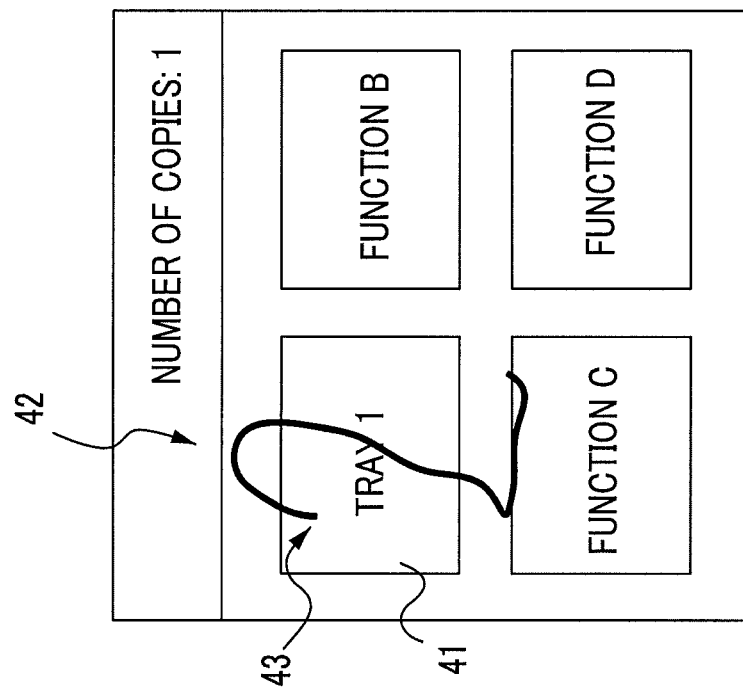

FIGS. 4A and 4B illustrate an example in which functions (a sheet tray setting function and functions B to D) are displayed on the operation panel 23 as a function that may be selected for image processing called copying. A function display (region) corresponding to each function is formed by a graphical user interface (GUI) component (function selecting component) for selecting the corresponding function.

As illustrated in FIG. 4A, referring to a function display region 41 of a sheet tray, "tray 1" is currently set as a sheet tray. Here, it is assumed that the user wants to change the sheet tray to "tray 2." In the related art, the user may select a function button for selecting a sheet tray to display a setting screen for a sheet tray selecting function on the operation panel and select "tray 2" on the setting screen. In this exemplary embodiment, the user may write a numerical value (in this example, "2") that the user wants to set and change within a target function display region. More specifically, the user inputs a setting value to be changed by a trail 42 of an operation for writing "2" so that a starting point 43 of the trail 42 is inside the function display region for the sheet tray. As a result, in this exemplary embodiment, as in the display example of the function display region 41 illustrated in FIG. 4B, the parameter of the sheet tray is set and changed to "tray 2."

Moreover, as illustrated in FIG. 5A, referring to a function display region 44 which represents that image processing for copying is selected and which represents the number of copies, "1" is currently set as the number of copies. Here, the user wants to copy "three" copies. In this case, the user writes "3" in the target function display region 44 so that a starting point 46 of a trail 45 of the operation for writing "3" is inside the function display region 44. As a result, the number of copies is set to "3" as in the display example of the function display region 44 illustrated in FIG. 5B.

A function setting process of setting and changing parameters according to the gesture will be described from the perspective of the operation of the image processing device 10 with reference to a screen display example illustrated in FIGS. 6A and 6B and the flowchart illustrated in FIG. 7.

The image processing device 10 causes the display processing unit 112 to display a function setting screen illustrated in FIG. 6A on the operation panel 23 according to a predetermined operation and performs standby until the user starts inputting an operation (step S101: N). Here, it is assumed that the user started inputting an operation with a starting point located within a function display region 47 of the function A. Although the operation is performed with a finger tip, a tool such as a pen may be used. When the operation receiving unit 111 detects the start of the operation (step S101: Y) and recognizes that the starting point of the operation is present within any one of the function display regions (step S102: Y), the display processing unit 112 highlights the function display region (step S103). When the starting point of the operation is not included in any one of the function display regions (step S102: N), the process returns to the beginning. FIG. 6B illustrates a display example of a function setting screen in which a starting point of a gesture 48 is included in the function display region 47 correlated with the function A, and the function display region 47 is highlighted. In this exemplary embodiment, the display form of the selected function display region 47 is highlighted by thickening the border line so that the display form is different from the display forms of the other function display regions. In this way, the selected function display region 47 may be easily perceived. A method of making the display forms different is not limited to this. For example, the type of border line or a display color may be made different, or the border line may flash. Alternatively, the display other than the selected function display region 47 may be shaded.

Here, when the end of the operation is recognized from the finger tip being separated from the operation panel 23 (step S104: Y), the display processing unit 112 stops the highlighting of the function display region 47 (step S105).

When the gesture recognition unit 12 recognizes the trail of the above operation, that is, the gesture, the function determining unit 13 determines a function that serves as a setting target of the parameter set by the gesture of the user from the gesture (step S106). More specifically, since the screen image displayed on the operation panel 23 and the display position information of the respective function display regions included in the screen image are known in advance, by comparing coordinate data that specifies the display positions of the respective function display regions with coordinate data of the starting point of the gesture, the function that serves as a setting target of the parameter is specified.

Subsequently, the parameter identification unit 14 identifies a parameter set to the function specified by the function determining unit 13 from the gesture recognized by the gesture recognition unit 12 (step S107). Parameters "2" and "3" are identified in the examples illustrated in FIGS. 4A and 5A, respectively. Although the parameter identification unit 14 may identify a character designated by the gesture by a character recognition process only, in this exemplary embodiment, since the type of parameters that may be set to the respective functions are registered in the function setting pattern storage unit 18, recognition accuracy may be improved by referring to the function setting pattern registered in the function setting pattern storage unit 18. Alternatively, by comparing the function setting pattern registered in the function setting pattern storage unit 18, in particular the first gesture with the character identified for the gesture through the character recognition process, it may be determined whether the operation of the user is a valid gesture for the selected function.

In this way, when the function selected by the user and the parameter of the function are set, the parameter setting unit 15 reflects the set parameter in the function selected by the user. In response to this, the control unit 17 causes the display processing unit 112 to update the display of the function display region corresponding to the function selected by the user with the content in which the set parameter is reflected (step S108). The user is informed of the fact that the set parameter is reflected by changing the display within the function display region 41 to "tray 2" based on "2" identified from the gesture in the example illustrated in FIG. 4B and changing the display within the function display region 44 to "3" based on "3" identified from the gesture in the example illustrated in FIG. 5B. Moreover, when an instruction to execute image processing is received from the user pressing an execute button (not illustrated), the image processing unit 16 executes image processing according to the parameters set to the respective functions.

Second Exemplary Embodiment

In the first embodiment, the function that serves as a setting target of the parameter is specified by the position of the starting point of the gesture. In this exemplary embodiment, rather than the starting point of the gesture, the function correlated with a function display region in which a largest amount of the gesture is included among the function display regions displayed on the function setting screen is determined as the function selected by the user.

Hereinafter, the operation of this exemplary embodiment is described. First, the operation of this exemplary embodiment will be described from the perspective of the user of the image processing device 10 with reference to FIG. 8.

Figure 8B:
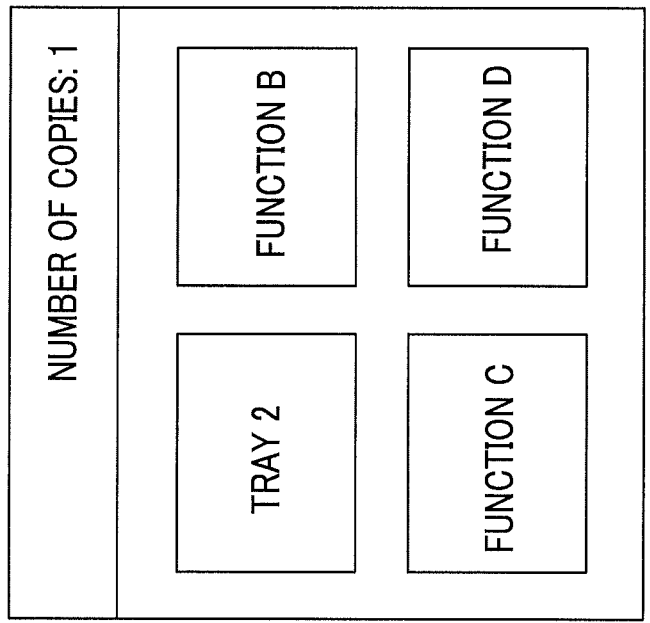
FIGS. 8A and 8B are diagrams illustrating an example of a function setting screen displayed on an operation panel of a second exemplary embodiment.
Figure 8A:
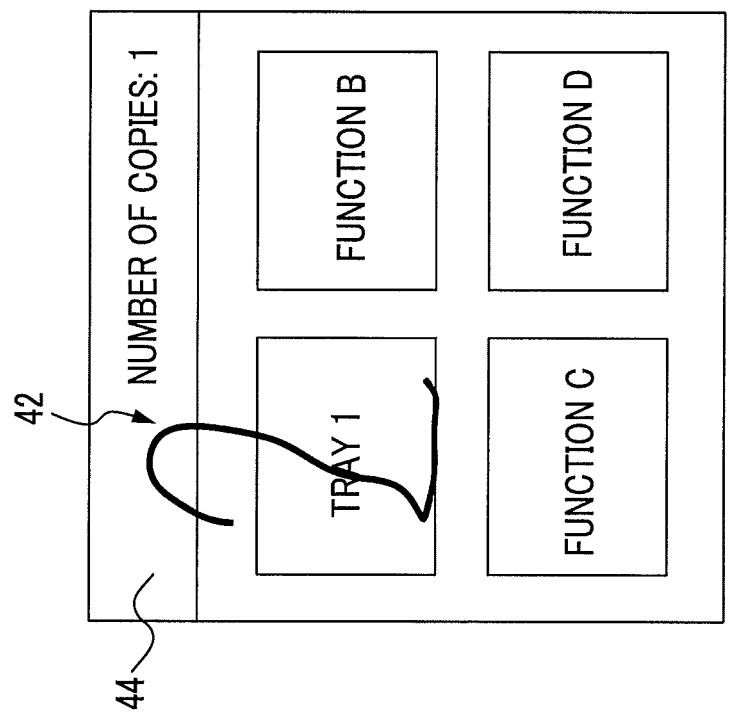

FIGS. 8A and 8B illustrate the same function setting screen as FIGS. 4A and 4B described in the first exemplary embodiment. As illustrated in FIG. 8A, referring to the function display region 41 of the sheet tray, "tray 1" is currently set as a sheet tray. Here, it is assumed that the user wants to change the sheet tray to "tray 2." In this exemplary embodiment, the user may write a numerical value (in this example, "2") that the user wants to set and change within a target function display region. More specifically, the user performs an operation so that a largest amount of the trail 42 of the operation of writing a parameter "2" to be changed are included in the function display region 41 of the sheet tray. As a result, in this exemplary embodiment, the parameter of the sheet tray is set and changed to "tray 2" as in the display example of the function display region 41 illustrated in FIG. 8B.

Figure 9:
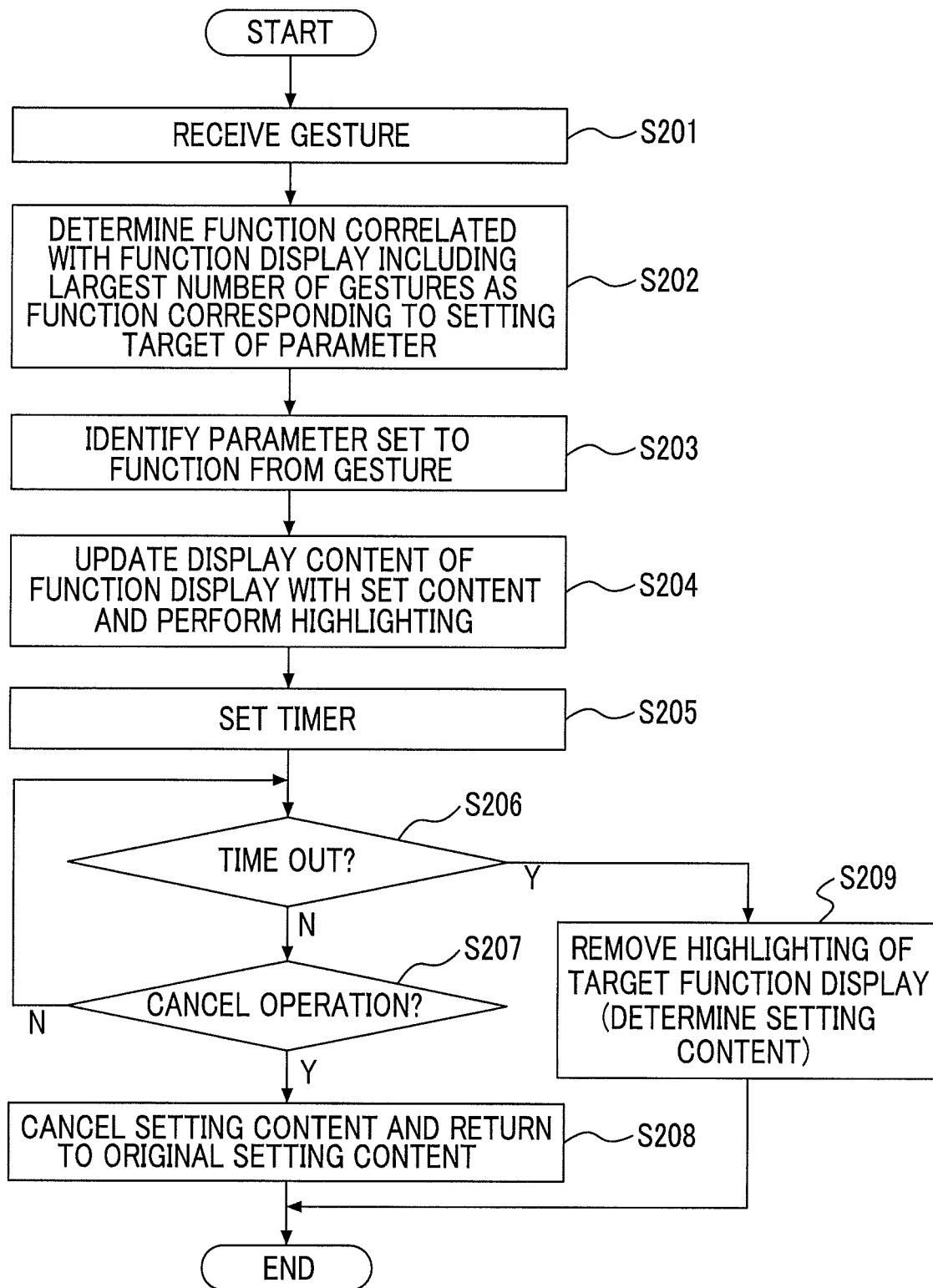
FIG. 9 is a flowchart illustrating a function setting process of the second exemplary embodiment.

A function setting process of setting and changing parameters according to a gesture will be described from the perspective of the operation of the image processing device 10 with reference to the flowchart illustrated in FIG. 9.

The image processing device 10 causes the display processing unit 112 to display a function setting screen illustrated in FIG. 8B on the operation panel 23 according to a predetermined operation and causes the user to perform a parameter setting operation. When the operation receiving unit 111 receives a gesture of the user performed on the operation panel 23 (step S201), the gesture recognition unit recognizes the gesture. Subsequently, the function determining unit 13 determines a function correlated with a function display region in which a largest amount of the gesture is included among the function display regions in which the gesture is included by referring to the gesture as a function that serves as a setting target of the parameter (step S202). More specifically, since the screen image displayed on the operation panel 23 and the display position information of the respective function display regions included in the screen image are known in advance, the length of the line of the gesture present within a display range of each of the function display regions is calculated, and the calculated line lengths are compared. In the example illustrated in FIG. 8A, although the gesture is also included in the function display region 41 and the function display region 42, since a larger amount of the gesture is included in the function display region 41, in this example, the function correlated with the function display region 41 is determined as the function that serves as a setting target of the parameter.

Subsequently, the parameter identification unit 14 identifies a parameter set to the function specified by the function determining unit 13 from the gesture recognized by the gesture recognition unit 12 (step S203). A parameter "2" is identified in the example illustrated in FIG. 8A. The process performed by the parameter identification unit 14 is the same as that of the first exemplary embodiment.

In this way, when the function selected by the user and the parameter of the function are set, the parameter setting unit 15 reflects the set parameter in the function selected by the user. The setting content before this updating is written to and stored in the setting information storage unit 19. The control unit 17 informs the user of the change in the setting by causing the display processing unit 112 to change the display form of the function display region 41 that serves as a setting target so as to be different from the display forms of the other function display regions. In this exemplary embodiment, the function display region 41 is highlighted (step S204). In this case, the parameter displayed within the function display region 41 is set to "tray 2." Subsequently, the control unit 17 sets a timer in order to provide a time to cancel the above operation of the user (step S205).

Here, the user perceives that the setting is not for a desired function or the parameter is not a desired setting value even if the setting is for the desired function by referring to the highlighted function display region 41 and performs a predetermined cancel operation. That is, before a timeout occurs (step S206: N), when the user performs a cancel operation (step S207: Y), the parameter setting unit 15 reads an immediately previous setting content stored in the setting information storage unit 19 and updates the setting with the read setting content. In this way, the above-described setting content is canceled and returned to the original setting content. In response to this, the control unit 17 causes the display processing unit 112 to stop the highlighting of the function display region 41 and to perform display in a state where the setting content is returned to the original setting content (step S208).

On the other hand, when the cancel operation is not performed until the timeout occurs (step S206: Y), the control unit 17 causes the display processing unit 112 to stop the highlighting of the function display region 41 (step S209). Moreover, in response to the timeout, the above-described setting content is confirmed. That is, the setting screen of the sheet tray is updated as illustrated in FIG. 8B.

As an example of the cancel operation of the user in the above-described process, after the highlighting in step S204, the user performs an operation of pressing a cancel button (not illustrated) displayed on the screen or performs an operation of inputting a predetermined gesture for canceling the setting.

Figure 10:
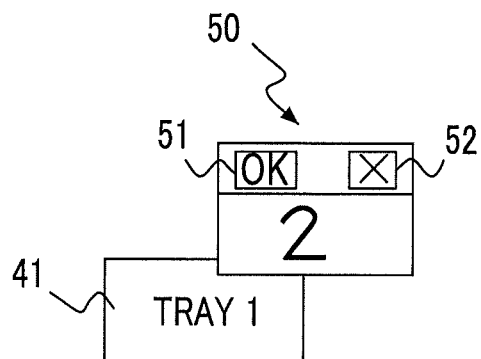
FIG. 10 is a diagram illustrating an example of a setting content confirmation screen used in the second exemplary embodiment.

However, in the above description, the user inputs confirmation in a state where the content of the gesture is reflected in the function display region 41. Moreover, when a desired function is not selected, the user has to cancel the setting. However, as illustrated in FIG. 10, a confirmation screen 50 that displays the setting content may be displayed as a pop-up window. That is, rather than reflecting the setting content in the function display region 41, the confirmation screen 50 is displayed so that the function determined to be selected by the user may be perceived. In FIG. 10, the confirmation screen 50 is displayed so as to be superimposed on the function display region 41 corresponding to the function that is determined to be selected. The confirmation screen 50 includes a region 51 where the gesture is displayed, an OK button 52 that is selected when a combination of the gesture and the function that serves as a setting content corresponding to the gesture is correct, and a cancel button 53 that is selected when the user wants to cancel the setting since the combination is not correct. Thus, the user selects any one of the OK button 52 or the cancel button 53 according to a confirmation command using the confirmation screen 50.

Moreover, the confirmation screen 50 is displayed so as to be movable on the screen, and if the setting is made for a function correlated with the other function display region, the user may move the confirmation screen 50 to a function display region corresponding to the proper function by a drag-and-drop operation, for example so that the moving operation is recognized as confirmation or may select the OK button 52 at the destination. For example, if the gesture "2" is intended to be set as a parameter of the number of copies, the user changes the setting to the setting for a copy count setting function by moving the confirmation screen 50 from the function display region 41 to a function display region for the copy count setting function. In this way, the cancel operation of step S207 of FIG. 9 may be not performed.

In this exemplary embodiment, the above-described pop-up window is displayed so as to be superimposed on the function display region 41 so that the function selected by the user may be identified, and the function may be changed so as to be correlated with a proper function if the function selected by the user is misperceived. It is not necessary to use the pop-up screen, and the corresponding function may be changed using another method.

Third Exemplary Embodiment

Depending on a parameter, there is a parameter which requires an additional parameter to be set subsequently to the set parameter. FIGS. 11A to 11D illustrate an example of such a case. FIGS. 11A to 11D are diagrams illustrating an example of a function display region corresponding to a function (hereinafter referred to as an "aggregated output function") of outputting plural pages on one sheet in an aggregated manner. According to the display example of the function display region 53 illustrated in FIG. 11A, a gesture for outputting four pages on one sheet together is input in a state where it is set not to use the aggregated output function. Here, when four pages are output on one sheet together (hereinafter referred to as "4up"), there are four patterns for arranging the pages, which include a pattern (hereinafter referred to as "Z") of top-left, top-right, bottom-left, and bottom-right, a pattern (hereinafter referred to as "inverted-Z") of top-right, top-left, bottom-right, and bottom-left, a pattern (hereinafter referred to as "inverted-N") of top-left, bottom-left, top-right, and bottom-right, and a pattern (hereinafter referred to as "N") of bottom-left, top-left, bottom-right, and top-right. Thus, when 4up is set as a parameter, it is necessary to set any one of the parameters of Z, inverted-Z, inverted-N, and N as a pattern for arranging the pages.

Thus, in this exemplary embodiment, when it is necessary to set an addition parameter depending on a parameter that is first set, the following operation is performed. First, the operation of this exemplary embodiment will be described from the perspective of the user of the image processing device 10 with reference to FIGS. 11A to 11D.

Figure 11A:
FIGS. 11A to 11D are diagrams illustrating a part of a function setting screen displayed on an operation panel of a third exemplary embodiment.
Figure 11B:
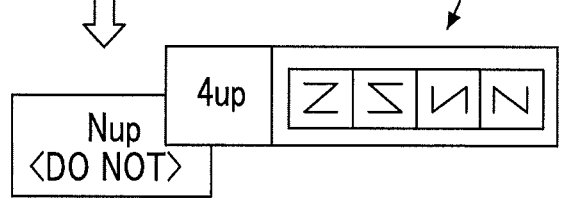
Figure 11C:
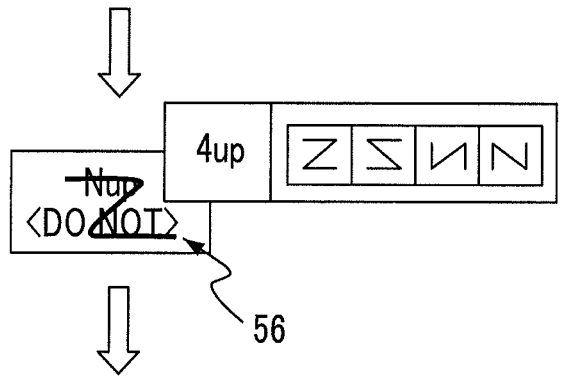

As illustrated in FIG. 11A, "4" is designated in a function display region 53 corresponding to the aggregated output function by a gesture 54. In the case of 4up, as described above, since there are four patterns for arranging the pages, a guide display screen 55 for setting the parameter (the "subsequent gesture" described in the first exemplary embodiment in FIG. 3) is displayed so as to be correlated with a function display region 53. In FIG. 11B, the guide display screen 55 is superimposed on the function display region 53 as an example of the correlation. Here, the user performs an operation of specifying any one of the parameters of Z, inverted-Z, inverted-N, and N as a pattern for arranging the pages by referring to the guide display screen 55. FIG. 11C illustrates an example of a gesture 56 of setting Z. As a result, as in the function display region 53 illustrated in FIG. 11D, 4up and an arrangement pattern of Z are set to the aggregated output function.

A function setting process of setting and changing parameters according to the gesture will be described from the perspective of the operation of the image processing device 10 with reference to the flowchart illustrated in FIG. 12.

The image processing device 10 causes the display processing unit 112 to display a function setting screen including the function display region 53 illustrated in FIG. 11A on the operation panel 23 according to a predetermined operation and causes the user to perform a parameter setting operation. When the operation receiving unit 111 receives a gesture of the user performed on the operation panel 23 (step S301), the gesture recognition unit 12 recognizes the gesture. Subsequently, the function determining unit 13 determines a function that serves as a setting target of the parameter by referring to the gesture and identifies the parameter to be set to the function to thereby confirm the function and the parameter (step S302). The determination of the function and the identification of the parameter in step S302 may be performed according to the method illustrated in the first or second exemplary embodiment. Thus, detailed description thereof will not be provided. By this process, according to the example illustrated in FIG. 11A, the first parameter "4" is identified by the first gesture.

Subsequently, the control unit 17 determines whether a subsequent parameter is required. That is, the control unit 17 refers to the setting content of the subsequent gesture of the function setting pattern information stored in the function setting pattern storage unit 18. Referring to the function setting pattern information illustrated in FIG. 3, it may be understood that in the case of the aggregated output function, when the first gesture is 3 or more, it is necessary to set any one of the parameters of Z, inverted-Z, inverted-N, and N as a subsequent parameter. Thus, when it is determined that it is necessary to set a subsequent parameter (step S303: Y), the control unit 17 causes the display processing unit 112 to display the guide display screen 55 illustrated in FIG. 11B so as to be correlated with the function display region 53 as necessary based on the setting content of the subsequent gesture. Referring to the function setting pattern information, in the case of the aggregated output function or the single-side/double-side copying function, it is preferable in terms of the user to generate and output the guide display screen in order to present an index as to which gesture should be performed. However, in the case of a binding function or a punching function, since the subsequent parameter is a number, it is not necessary to output the guide display screen 55. Subsequently, the control unit 17 sets a timer in order to provide a time to stop the above operation of the user (step S304).

Here, when the user does not perform an operation different from the first gesture, that is, an operation for setting a subsequent parameter before a timeout occurs (step S307: N, step S305: Y), and when the user performs an operation of stopping the operation (step S306: Y) even before the timeout occurs (step S305: N), the setting process for the aggregated output function stops. An example of an operation for stopping the operation includes an operation of selecting an operation stopping button displayed on the screen and an operation of the user adding a predetermined gesture that means stopping of the operation to the gesture. On the other hand, when the user performs an operation of setting a subsequent parameter before the timeout occurs (step S307: Y), the subsequent parameter set by the subsequent gesture is held as a parameter that is additionally set for the target function in addition to the first parameter set by the first gesture (step S308). By this process, according to the example illustrated in FIG. 11C, a subsequent parameter "Z" is identified by the subsequent gesture.

Figure 11D:
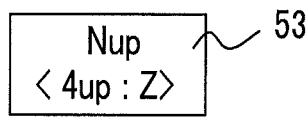

Subsequently, the process returns to step S303, and it is determined whether an additional subsequent parameter is required. However, in the example illustrated in FIGS. 11A to 11D, the subsequent parameter is not required. When an additional subsequent parameter is required, the above-described processes (steps S304 to S308) are repeatedly performed. When the subsequent parameter is not required (step S303: N), the parameter setting unit 15 confirms all parameters ("4up" and the arrangement pattern of "Z") set for the function (in this example, the aggregated output function) selected by the user (step S309). In response to this, the control unit 17 causes the display processing unit 112 to update the display of the function display region corresponding to the function selected by the user with the setting content in which the setting parameters are reflected (step S310). FIG. 11D illustrates a display example of this case.

As described above, the above-described processes may be performed when it is necessary to set an additional parameter for the parameter that is first set.

Fourth Exemplary Embodiment

Depending on a function provided by image processing, the number of received characters (digits) may be determined according to the intention of the user. For example, in a copy count setting function capable of setting the number of copies in the range of 1 to 999, when an input operation of "1" and "0," for example, is performed, it is not clear whether the user intends to designate 10 copies or the user intends to continue an operation of "0" to "9" to designate 100 to 109 copies at the point in time when the operation corresponding to two digits is performed. As above, although it is possible to confirm the input when the user performs an operation that represents a three-digit number, it may be desirable to provide a certain determination criterion for confirming the input operation even when an operation corresponding to one digit or two digits is input.

Therefore, in this exemplary embodiment, it is determined that an operation for setting a parameter at the point in time when a predetermined period has elapsed from the last operation is an ending operation, that is the end of the operation is determined according to the timeout. Moreover, when the user wants to confirm the input operation without reaching the upper-limit digit, the user may input a predetermined gesture that means the end of the operation.

Figure 13:
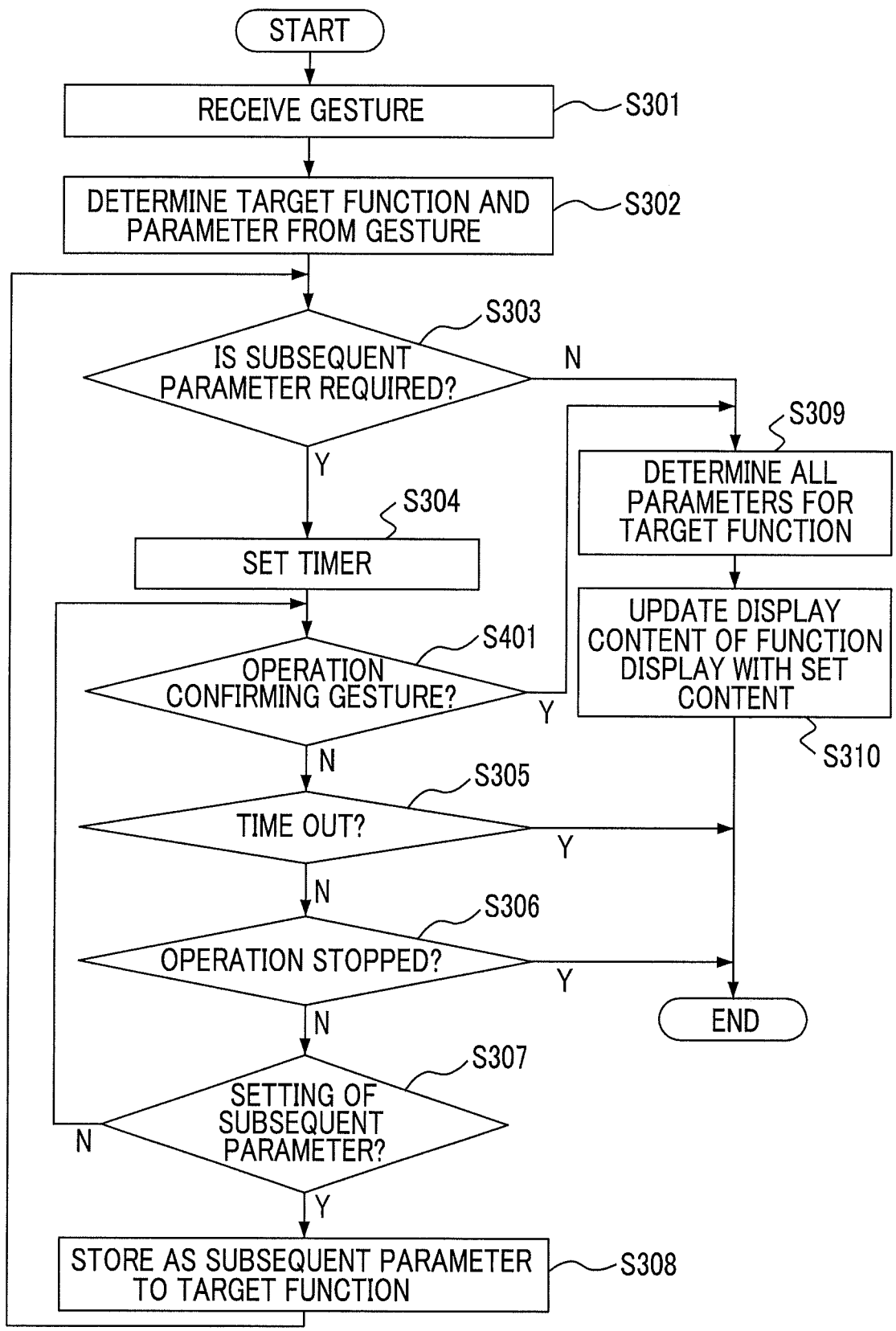
FIG. 13 is a flowchart illustrating a function setting process of a fourth exemplary embodiment.

FIG. 13 is a flowchart illustrating a process of setting and changing parameters according to this exemplary embodiment. Since the process according to this exemplary embodiment is basically the same as that of the third exemplary embodiment (FIG. 12), the same processes as those of FIG. 12 will be denoted by the same step numbers, and redundant description will not be provided appropriately. In this exemplary embodiment, step S401 is added to the processing content of the third exemplary embodiment. Specifically, a function that serves as a setting target of the parameter and a parameter to be set to the function are confirmed from the first gesture (step S302). As a result, when it is determined that setting of a subsequent parameter is required (step S303: Y), the timer is set (step S304). When the user performs a certain operation before a timeout occurs, and the parameter identification unit 14 determines that the gesture is a gesture that means ending of the operation (step S401: Y), the parameter setting unit 15 confirms all parameters based on the gestures performed immediately before the gesture that means the ending of the detected operation (step S309). In response to this, the control unit 17 causes the display processing unit 112 to update the display of the function display region corresponding to the function selected by the user with the setting content in which the set parameters are reflected (step S310).

According to the above example in which the user wants to set the number of copies to 10 copies in a copy count setting function capable of setting the number of copies in the range of 1 to 999, since a numerical value corresponding to the upper-limit third digit is not input at the point in time when the user inputs the gesture of "1," it is determined that a subsequent gesture is required (step S303: Y). Moreover, when a gesture (that is, the gesture of "0") that designates a subsequent parameter before the occurrence of the timeout is input (step S307: Y), since the numerical value corresponding to the upper-limit third digit is not input at that point in time, it is determined that the subsequent gesture is required (step S303: Y). Moreover, when the user inputs a gesture that means the ending of the operation before the occurrence of the timeout (step S401: Y), the setting is finalized for the copy count setting function into the content that the number of copies is 10 copies (step S309).

Fifth Exemplary Embodiment

A gesture for canceling the parameter set by the gesture, a gesture for stopping the operation, and a gesture for confirming the operation are set in advance respectively in the second, third, and fourth exemplary embodiments. In this way, when the user inputs an operation corresponding to each of the gestures, it may be recognized that an instruction to cancel the set parameter, stop the operation, or confirm the operation is received. However, the invention is not limited to this, and a gesture for returning the set parameter to the initial setting may be set in advance.

FIG. 3 illustrates a gesture "Λ" corresponding to a gesture for returning the setting to the initial setting. The parameter identification unit 14 compares the operation performed by the user with the gesture for returning the setting to the initial setting included in the function setting pattern information. When the gesture for returning the setting to the initial setting is detected, the parameter setting unit 15 reads an initial value of the parameter for the function stored in the setting information storage unit 19, for example, and set the read initial value to thereby return the setting for executing image processing to the initial state.

In this exemplary embodiment, although the user may return the parameter to be set for only the functions, in which a gesture for returning the setting to the initial setting is written, to the initial setting, a gesture for returning parameters for all functions to the initial state such as a gesture corresponding to a reset button may be provided.

Sixth Exemplary Embodiment

For example, in the case of a binding function or a punching function, when the function is selected, it is necessary to set the position and the number of positions at which the sheet is bound or punched as a parameter. This exemplary embodiment may deal with such a function.

Figure 14A:
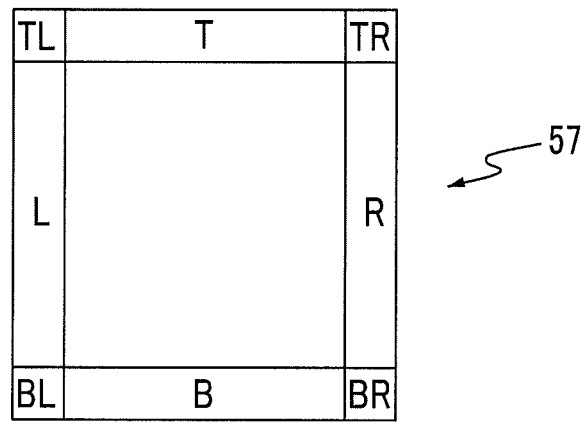
FIGS. 14A to 14C are diagrams illustrating a part of a function setting screen displayed on an operation panel of a sixth exemplary embodiment.
Figure 14B:
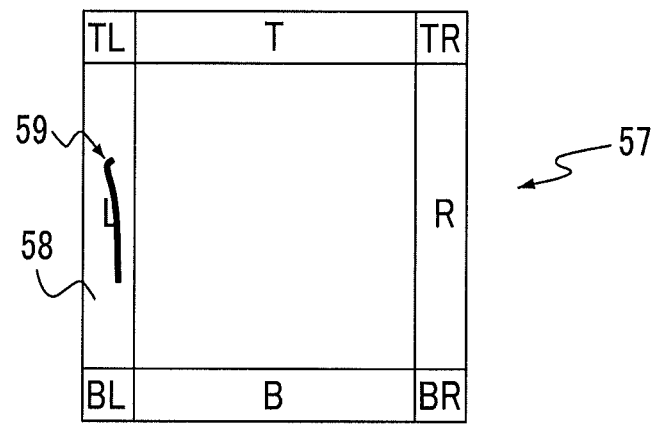
Figure 14C:
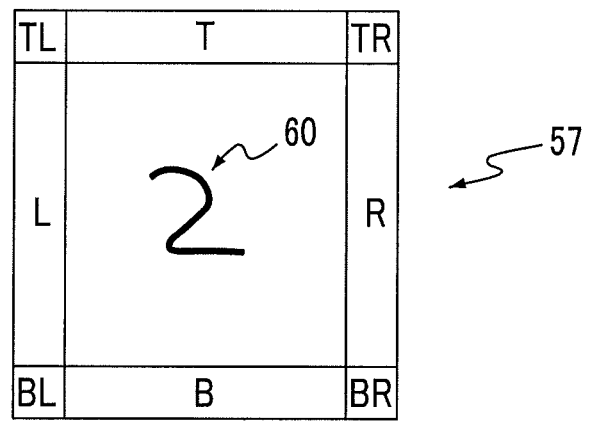

FIGS. 14A to 14C are diagrams illustrating an example of a function display region of a binding function. In this exemplary embodiment, although it is assumed that the function display region is displayed on the function setting screen illustrated in FIGS. 4A and 4B or the like, the function display region may be displayed on the operation panel 23 when a binding function is selected on the function setting screen illustrated in FIGS. 4A and 4B.

FIGS. 14A to 14C illustrate a function display region of a binding function, which resembles a sheet. As illustrated in FIG. 14A, the function display region 57 is segmented into 8 areas in total which includes left, right, top, and bottom areas and the four corner areas, as positions at which the sheet may be bound by a stapler. That is, the user may select a sheet binding position from eight positions.

In the function display region 57, the user performs an operation at a position that the user wants to designate as a binding position. FIG. 14B illustrates a gesture 59 that involves an operation of drawing a line within an area 58 that represents the left "L." Moreover, FIG. 14C illustrates a gesture 60 of "2" that involves a writing operation with the function display region 57. That is, the user designates the left end as the binding position at the position of the first gesture 59 as illustrated in FIG. 14B and designates "2" as the number of binding positions with the gesture 60 subsequent to the first gesture 59 as illustrated in FIG. 14C. The process of this exemplary embodiment may be the same as that of the third exemplary embodiment (FIG. 12), and redundant description will not be provided.

Although a method of setting parameters of a characteristic function has been described in the respective exemplary embodiments, the characteristic points described in the respective exemplary embodiments may be combined appropriately.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising a processor configured to:
   cause a display to display a graphical user interface comprising a plurality of items, wherein each of the plurality of items on the graphical interface displays an indication of a current parameter currently set to a respective item of the plurality of items;
   receive an input from a user, the input being scribing over two or more items of the plurality of items displayed on the display;
   provide the user with a substantially real-time feedback of the scribing by applying digital ink indicating a scribed trail on the graphical user interface, the scribed trail being a continuous scribed line;
   selecting a first item that has a largest amount of overlapping portion overlapping the scribed trail;
   in response to (1) the scribed trail selecting the first item from among the two or more items based on a position of the scribed trail within the graphical user interface and (2) an entirety of the scribed trail being recognized as a first predetermined trail representing a first processing from among a plurality of predetermined trails each corresponding to a predetermined processing, perform the first processing on the first item; and
   in response to (1) the scribed trail selecting the first item and (2) the entirety of the scribed trail being recognized as a second predetermined trail representing a second processing from among the plurality of predetermined trails, perform the second processing on the first item,
   wherein the scribed trail selects only one item as the first item based on the position of the scribed trail within the graphical user interface.

2. The information processing apparatus of claim 1, wherein the first processing comprises updating the current parameter of the first item to an updated parameter corresponding to the first predetermined trail.

3. The information processing apparatus of claim 2, wherein the indication of the current parameter is visually displayed prior to the scribing of the scribed trail and then, after the scribing of the scribed trail, an indication of the updated parameter is visually displayed.

4. The information processing apparatus of claim 1, wherein the selecting of the first item is based on more than one point on the scribed trail.

5. The information processing apparatus of claim 2, wherein the selecting of the first item is based on more than one point on the scribed trail.

6. The information processing apparatus of claim 1, wherein the selecting of the first item based at least in part on a portion of the scribed trail other than a start point of the scribed trail.

7. The information processing apparatus of claim 2, wherein the selecting of the first item based at least in part on a portion of the scribed trail other than a start point of the scribed trail.

8. The information processing apparatus of claim 1, wherein the selecting of the first item is based at least in part on a middle portion of the scribed trail.

9. The information processing apparatus of claim 2, wherein the selecting of the first item is based at least in part on a middle portion of the scribed trail.

10. The information processing apparatus of claim 3, wherein the selecting of the first item is based at least in part on a middle portion of the scribed trail.

11. The information processing apparatus of claim 1, wherein the plurality of items are a plurality of visible, selectable graphical user interface components.

12. The information processing apparatus of claim 11, wherein the plurality of graphical user interface components are options from which the user can make a selection.

13. The information processing apparatus of claim 1, wherein the processor is configured to, when updating the parameter of the first item to the updated parameter, provide the user with a visual feedback indicating that the current parameter of the first item is updated to the updated parameter, and
wherein the visual feedback is different from the digital ink indicating the scribed trail.

14. The information processing apparatus of claim 13, wherein each of the plurality of items displays a text string indicating the current parameter of the respective item, and
wherein the visual feedback changes the text string from a first value that is displayed to a second value indicating the updated parameter.

15. The information processing apparatus of claim 1, wherein the second processing is setting a second parameter corresponding to the second predetermined trail to the first item.

16. A non-transitory computer readable medium storing a program that causes a computer to execute information processing, the information processing comprising:
   causing a display to display a graphical user interface comprising a plurality of items, wherein each of the plurality of items on the graphical interface displays an indication of a current parameter currently set to a respective item of the plurality of items; receiving an input from a user, the input being scribing over any of the plurality of items displayed on the display;

providing the user with a substantially real-time feedback of the scribing by applying digital ink indicating a scribed trail on the graphical user interface, the scribed trail being a continuous scribed line;

wherein the scribed trail overlaps two or more neighboring items of the plurality of items, and wherein the processing is configured to select only one of the two or more neighboring items as the first item only using the scribed trail which is a continuous trail;

selecting a first item that has a largest amount of overlapping portion overlapping the scribed trail;

in response to (1) the scribed trail selecting the first item from among the two or more items based on a position of the scribed trail within the graphical user interface and (2) an entirety of the scribed trail being recognized as a first predetermined trail representing a first processing from among a plurality of predetermined trails each corresponding to a predetermined processing, perform the first processing on the first item; and in response to (1) the scribed trail selecting the first item and (2) the entirety of the scribed trail being recognized as a second predetermined trail representing a second processing from among the plurality of predetermined trails, perform the second processing on the first item.

17. The information processing apparatus of claim 16, wherein the processor is configured to determines a third item that has a largest amount of overlapping portion overlapping the scribed line and selects only the third item as the first item.

18. A non-transitory computer readable medium storing a program that causes a computer to execute information processing, the information processing comprising:

cause a display to display a graphical user interface comprising a plurality of items, wherein each of the plurality of items on the graphical interface displays an indication of a current parameter currently set to a respective item of the plurality of items;

receive an input from a user, the input being scribing over any of the plurality of items displayed on the display;

provide the user with a substantially real-time feedback of the scribing by applying digital ink indicating a scribed trail on the graphical user interface, the scribed trail being a continuous scribed line that overlaps two or more neighboring items of the plurality of items;

select only one of the two or more neighboring items as a first item of the plurality of items based on (1) a position of the scribed trail within the graphical user interface, and (2) the first item having a largest amount of overlapping portion overlapping the scribed trail;

recognize a trail of the scribed trail;

in response to the scribed trail (1) resulting in selection of the first item from only one of the two or more neighboring items and (2) being recognized as a first predetermined trail, perform on the first item first processing corresponding to the first predetermined trail so that the first processing and the selected first item are both based on scribing of the scribed trail; and in response to the scribed trail (1) selecting the first item and (2) being recognized as a second predetermined trail, perform on the first item second processing corresponding to the second predetermined trail so that the second processing and the selected first item are both based on scribing of the scribed trail, the second processing being different from the first processing, wherein the first processing comprises updating the current parameter of the first item to an updated parameter corresponding to the first predetermined trail, and wherein the indication of the current parameter is visually displayed prior to the scribing of the scribed trail and then, after the scribing of the scribed trail, an indication of the updated parameter is visually displayed.

* * * * *